(12) United States Patent
Kawai et al.

(10) Patent No.: US 8,038,385 B2
(45) Date of Patent: Oct. 18, 2011

(54) SPINDLE DEVICE WITH ROTOR JETTING DRIVING FLUID

(75) Inventors: Tomohiko Kawai, Yamanashi (JP);
Kenzo Ebihara, Yamanashi (JP);
Takeshi Ooki, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 521 days.

(21) Appl. No.: 12/334,792

(22) Filed: Dec. 15, 2008

(65) Prior Publication Data
US 2009/0229246 A1 Sep. 17, 2009

(30) Foreign Application Priority Data

Mar. 13, 2008 (JP) .................................. 2008-064216

(51) Int. Cl.
*F01D 1/18* (2006.01)
(52) U.S. Cl. .............................. 415/80; 415/110; 60/263
(58) Field of Classification Search .............. 415/80–82, 415/110–113; 60/221, 222, 263
See application file for complete search history.

(56) References Cited

U.S. PATENT DOCUMENTS

| | | | | |
|---|---|---|---|---|
| 3,104,803 A | * | 9/1963 | Flatt | 417/326 |
| 3,304,051 A | | 2/1967 | Calhoun | |
| 3,969,042 A | * | 7/1976 | Bachler | 417/354 |
| 4,332,520 A | * | 6/1982 | House | 415/63 |
| 4,430,042 A | * | 2/1984 | House | 415/1 |
| 4,808,070 A | * | 2/1989 | Fonda-Bonardi | 415/110 |
| 4,884,899 A | * | 12/1989 | Schwartzman | 384/100 |
| 4,890,424 A | * | 1/1990 | Dzewaltowski | 451/342 |
| 5,236,349 A | * | 8/1993 | Fabris | 415/80 |
| 5,433,529 A | * | 7/1995 | Hensel | 384/112 |
| 5,525,034 A | * | 6/1996 | Hays | 415/80 |
| 5,533,814 A | * | 7/1996 | Slocum | 384/123 |
| 5,901,643 A | * | 5/1999 | Bornhorst | 100/282 |
| 6,219,199 B1 | * | 4/2001 | Sakuragi et al. | 360/99.08 |
| 6,368,052 B2 | * | 4/2002 | Uesugi et al. | 415/80 |
| 6,726,215 B2 | * | 4/2004 | Uesugi et al. | 277/431 |
| 6,783,320 B2 | * | 8/2004 | Johnson | 415/80 |

(Continued)

FOREIGN PATENT DOCUMENTS

JP 59037004 A 2/1984

(Continued)

OTHER PUBLICATIONS

Notice of Reasons for Rejection for JP2008-064216 mailed Mar. 17, 2009.

(Continued)

*Primary Examiner* — Ross Gushi
(74) *Attorney, Agent, or Firm* — Lowe Hauptman Ham & Berner LLP

(57) ABSTRACT

A spindle device driven by driving fluid, having accurate rotation and superior quietness. The device includes a stator having at least one inlet for introducing the driving fluid, a rotor having at least one flange arranged outside of the stator and provided with nozzles for jetting the driving fluid, and a static-pressure fluid bearing for rotatably supporting the rotor with respect to the stator. The stator has a first inner path for conducting the driving fluid introduced from the inlet to the rotor and the rotor has a second inner path communicating with the first inner path of the stator for conducting the driving fluid to the nozzles. The driving fluid introduced from the inlet of the stator is jetted from the nozzles of the rotor through the first and second inner paths to rotate the rotor.

7 Claims, 7 Drawing Sheets

U.S. PATENT DOCUMENTS

| | | | | |
|---|---|---|---|---|
| 6,980,393 | B2* | 12/2005 | Kull | 360/99.08 |
| 6,997,674 | B1* | 2/2006 | Johnson | 415/80 |
| 7,294,946 | B2* | 11/2007 | Jyono et al. | 310/90 |
| 7,314,347 | B2* | 1/2008 | Johnson | 415/80 |
| 7,722,313 | B1* | 5/2010 | Dilorio | 415/80 |
| 7,794,151 | B2* | 9/2010 | Neumann | 384/100 |
| 7,866,889 | B2* | 1/2011 | Winterhalter | 384/107 |
| 2001/0014281 | A1* | 8/2001 | Uesugi et al. | 415/111 |
| 2003/0197975 | A1* | 10/2003 | Kull | 360/99.08 |
| 2003/0202722 | A1* | 10/2003 | Obara | 384/107 |
| 2004/0076352 | A1* | 4/2004 | Price et al. | 384/119 |
| 2005/0249582 | A1* | 11/2005 | Johnson | 415/80 |
| 2006/0034677 | A1* | 2/2006 | Johnson | 415/80 |
| 2006/0056751 | A1* | 3/2006 | Engesser et al. | 384/100 |
| 2006/0078240 | A1* | 4/2006 | Braun | 384/107 |
| 2006/0267434 | A1* | 11/2006 | Kodama | 310/90 |
| 2007/0147716 | A1* | 6/2007 | Kull et al. | 384/100 |
| 2007/0183696 | A1* | 8/2007 | Winterhalter | 384/100 |
| 2007/0183700 | A1* | 8/2007 | Winterhalter | 384/114 |
| 2007/0206889 | A1* | 9/2007 | Obara et al. | 384/100 |
| 2007/0222314 | A1* | 9/2007 | Drautz | 310/90 |
| 2007/0223848 | A1* | 9/2007 | Winterhalter | 384/100 |
| 2008/0062555 | A1* | 3/2008 | Oshimi et al. | 360/73.03 |
| 2008/0089625 | A1* | 4/2008 | Engesser et al. | 384/110 |
| 2008/0100155 | A1* | 5/2008 | Engesser et al. | 310/46 |
| 2008/0124012 | A1* | 5/2008 | Drautz | 384/110 |
| 2008/0187257 | A1* | 8/2008 | Engesser et al. | 384/107 |
| 2009/0080819 | A1* | 3/2009 | Rehm | 384/241 |
| 2009/0140587 | A1* | 6/2009 | Popov et al. | 310/90 |
| 2009/0140588 | A1* | 6/2009 | Drautz et al. | 310/90 |
| 2009/0160277 | A1* | 6/2009 | Obara | 310/90 |
| 2009/0229246 | A1* | 9/2009 | Kawai et al. | 60/263 |

FOREIGN PATENT DOCUMENTS

| | | |
|---|---|---|
| JP | 2001225240 A | 8/2001 |
| JP | 2003-191142 | 7/2003 |

OTHER PUBLICATIONS

EP Search Report for EP08106002.2 dated Apr. 21, 2009.

* cited by examiner

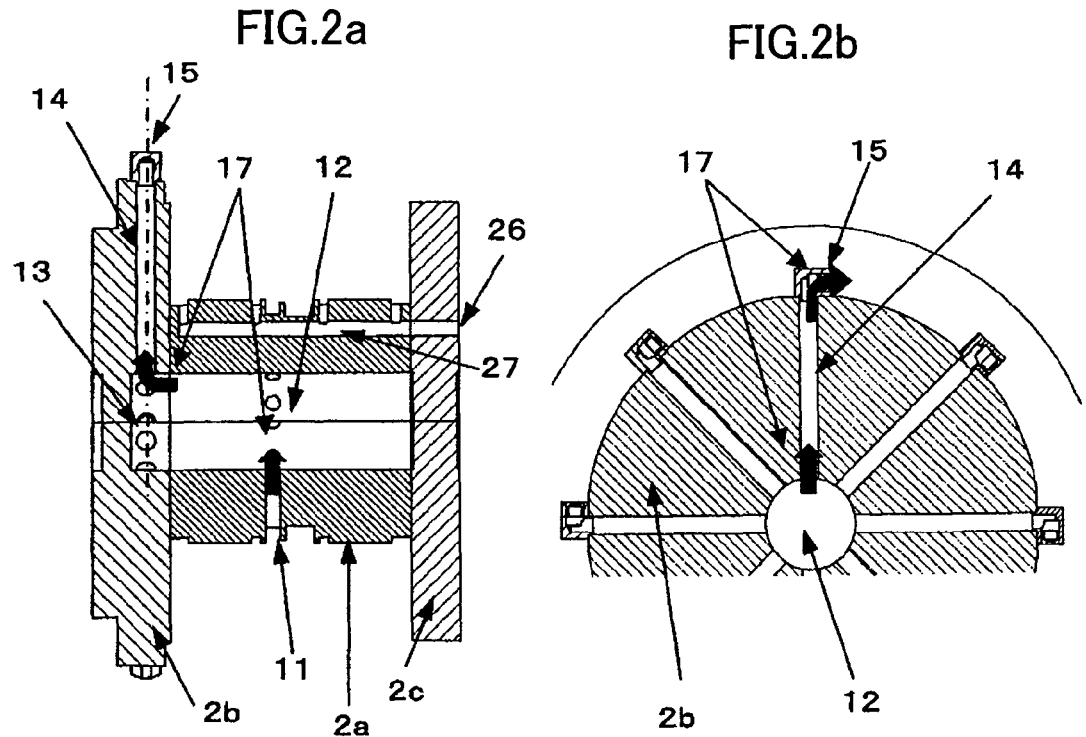
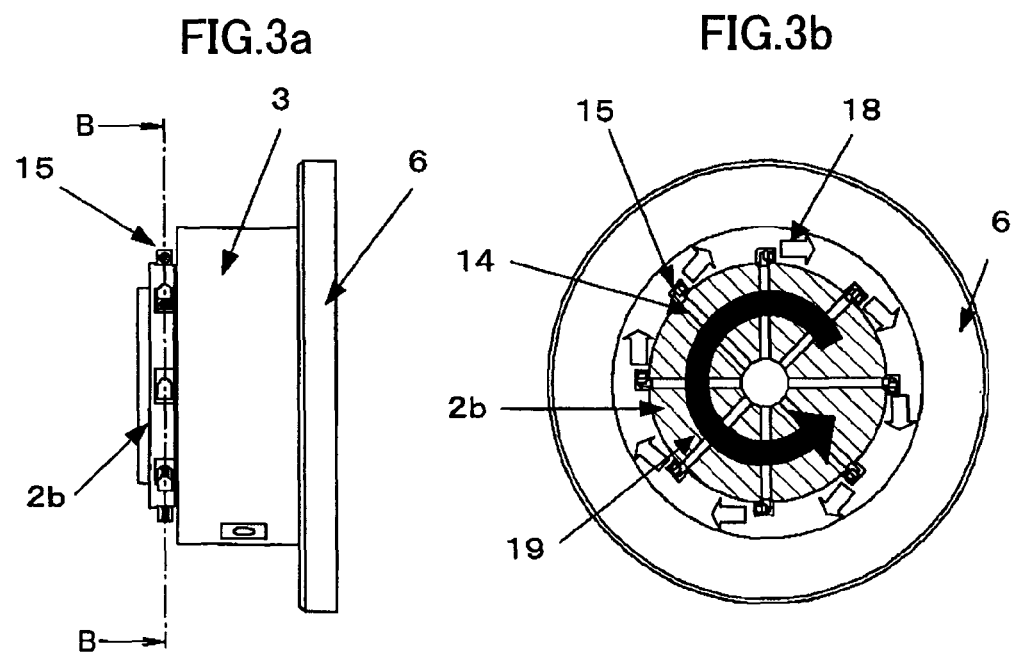

(ROTOR SIDE)

(STATOR SIDE)

DRIVING FLUID WITH FLOW RATE INCREASED BY NOZZLE THROTTLE

SPINDLE DEVICE WITH ROTOR JETTING DRIVING FLUID

RELATED APPLICATIONS

The present application is based on, and claims priority from, Japanese Application Number 2008-064216, filed Mar. 13, 2008, the disclosure of which is hereby incorporated by reference herein in its entirety.

BACKGROUND OF THE INVENTION

1. Field of the Invention

The present invention relates to a spindle device rotatively driven by fluid such as air, and more particularly to a spindle device driven by jetting the fluid from a rotor.

2. Description of Related Art

In ultra-precision machine tools for boring and cutting, static-pressure air bearing air turbine spindles are used for the spindles of such ultra-precision machine tools because of the high degree of accuracy required and in order to reduce heat generation. An air turbine spindle rotates by jetting pressurized fluid from nozzles provided on a non-rotating side of the spindle against multiple blades provided on a rotor that is a rotating body.

In general, compared to a spindle device that uses an electric motor as a drive source, such an air turbine spindle can rotate the spindle at higher velocity with greater accuracy and less vibration, and since little heat is generated can also reduce stretching of the spindle (that is, thermal expansion in the axial direction).

In the case of lathing, in which a workpiece is fixed on the rotor of the air turbine spindle and a machining load is exerted on the workpiece, the pattern of the blades provided on the rotor that is the drive source sometimes appears on the surface of the workpiece. For example, in flat surface or spherical surface lathing, a pattern formed in the shape of rays of approximately several tens of nanometers that correspond to the number of blades sometimes appears on the surface of the workpiece.

The phenomenon of the appearance of the pattern of the blades on the workpiece is caused by the periodical impact of the fluid on the blades and on the nozzles of the air turbine spindle. In order to eliminate this periodical impact of the fluid, in JP2003-191142A a technique is disclosed of jetting fluid into space from inside the rotor disposed inside the stator to rotatably drive the rotor.

In the related art described in the background art, the rotor jets fluid used for rotational drive inside the spindle and expels the fluid to the outside of the spindle through outlets provided in the spindle. As a result, when the nozzles traverse the outlets, the flow of the fluid jetted from the rotor changes, and the impact of that change on the flow of the fluid affects the rotor.

In addition, because the fluid supplied to the fluid bearing is supplied through the same path as the fluid for obtaining a driving force, when the rpm of the spindle fluctuates the bearing pressure changes. For these reasons, it is difficult for the spindle described in the background art to achieve accurate rotation.

SUMMARY OF THE INVENTION

The present invention provides a spindle device capable of achieving accurate rotation as well as superior quietness.

A spindle device of the present invention is driven by driving fluid. The spindle device comprises: a stator having at least one inlet for introducing the driving fluid; a rotor having at least one flange arranged outside of the stator and provided with nozzles for jetting the driving fluid; and a static-pressure fluid bearing for rotatably supporting the rotor with respect to the stator. The stator has a first inner path for conducting the driving fluid introduced from the inlet to the rotor, and the rotor has a second inner path communicating with the first inner path of the stator for conducting the driving fluid to the nozzles, thereby the driving fluid introduced from the inlet of the stator is jetted from the nozzles of the rotor through the first and second inner paths to rotate the rotor.

The nozzles may have throttle members.

An outlet of the first inner path of the stator and an inlet of the second inner path of the rotor may be arranged to be displaced with each other in a direction of a rotational axis of the rotor, and a surface of the rotor facing the outlet of the first inner path may be formed smooth in a direction of the rotational axis of the rotor.

An exhaust space for discharging fluid of the fluid bearing may be provided in a vicinity of a junction of the first inner path of the stator and the second inner path of the rotor, and seal surfaces having the same gap as the fluid bearing may be provided between the exhaust space and the junction.

The driving fluid jetted from the nozzles may be directed to form an angle with respect to a plane perpendicular to a rotational axis of the rotor or to form an angle with respect to a tangential direction of the flange of the rotor.

The rotor may have two flanges each provided with the nozzles for jetting the driving fluid.

In this case, the nozzles provided on one of the two flanges may be arranged to jet the driving fluid to rotate the rotor clockwise, the nozzles provided on the other of the two flanges may be arranged to jet the driving fluid to rotate the rotor counterclockwise, and the spindle device may further comprise means that selectively supplies the driving fluid to the nozzles of the two flanges.

According to the present invention, there is provided a spindle device capable of eliminating periodical effects due to rotation of the rotor to achieve accurate rotation as well as superior quietness.

BRIEF DESCRIPTION OF THE DRAWINGS

FIGS. 2a and 2b are diagrams showing the internal structure of a rotor and flow of driving fluid in the spindle device according to the first embodiment of the present invention;

FIGS. 3a and 3b are diagrams showing fluid jetting directions and a direction of rotor rotation in the spindle device according to the first embodiment of the present invention;

DETAILED DESCRIPTION

Figure 1:
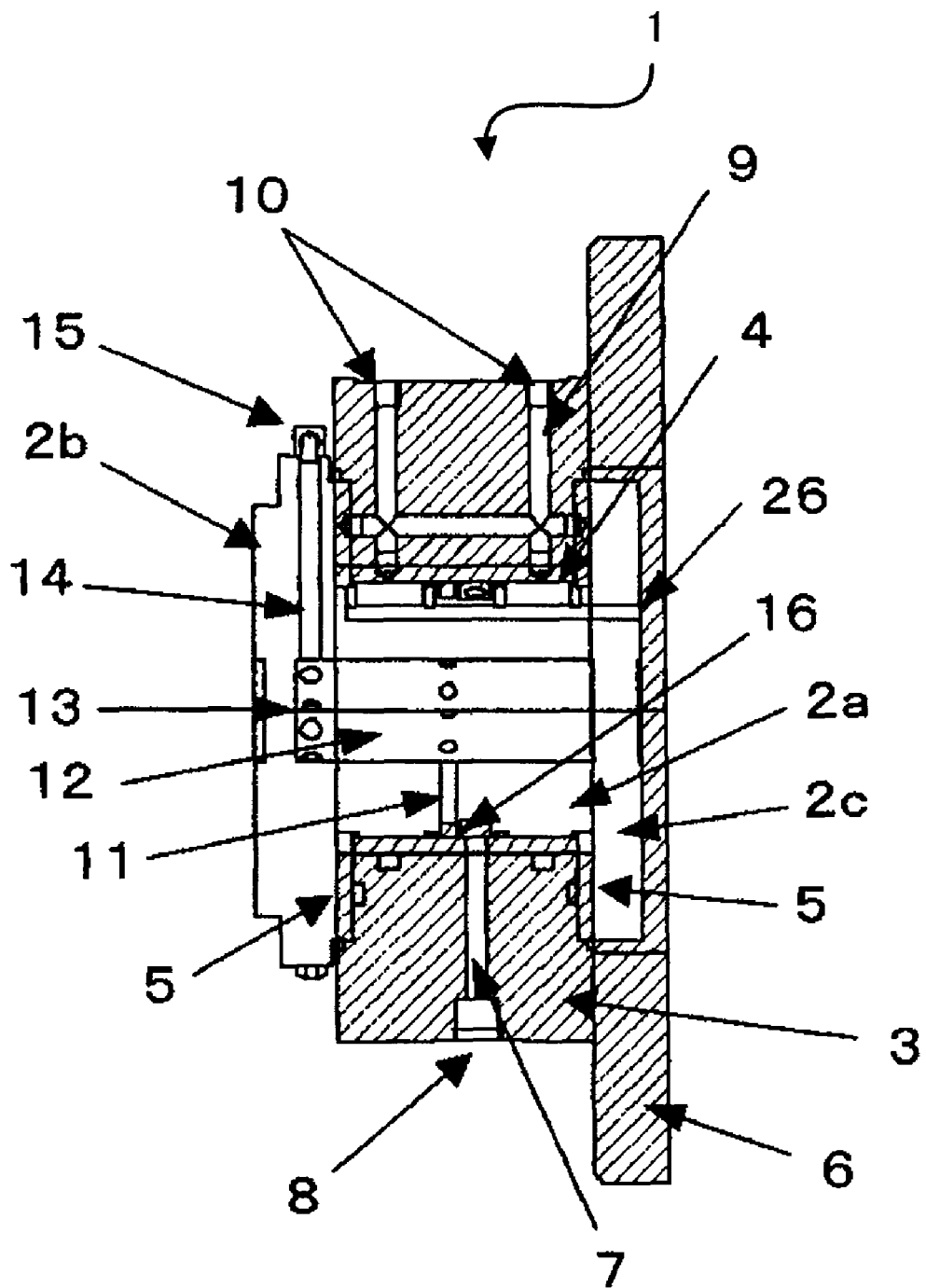
FIG. 1 is a diagram showing an internal structure of a spindle device according to a first embodiment of the present invention.

FIG. 1 shows an internal structure of a spindle device according to a first embodiment of the present invention.

A spindle device 1 comprises a rotor 2, a stator 3, a radial bearing 4 that supports the rotor 2 in a radial direction, and a thrust bearing 5 that supports the rotor 2 in a thrust direction. The radial bearing 4 and the thrust bearing 5 are static-pressure fluid bearings. By using static-pressure fluid bearings, the rotor 2 and the stator 3 are put into a contactless state.

In the stator 3 is provided with a through-hole. The rotor 2 has a central shaft 2a that passes through the through-hole in the stator 3 and flanges 2b, 2c provided on both ends of the central shaft 2a and extending outside the stator 3. The central shaft 2a of the rotor 2 is rotatably supported in the thoughhole of the stator by a static-pressure fluid bearing. A base 6 is a pedestal for setting the spindle device 1 on a machine tool or the like. The radial bearing 4 supports the central shaft 2a of the rotor 2 along its outer peripheral surface, while the thrust bearing 5 supports the flanges 2b, 2c of the rotor 2 on one side surface.

Inside the stator 3 is provided a stator inner path that conducts the driving fluid and a driving fluid inlet 8 for supplying driving fluid to the outer peripheral surface of the stator 3. In addition, inside the stator 3 is provided a bearing fluid path 9 for supplying fluid to the radial bearing 4 and the thrust bearing 5. Further, on the outer peripheral surface of the stator 3 is provided a static-pressure fluid bearing fluid inlet 10 for the radial bearing 4 and the thrust bearing 5.

Inside the central shaft 2a of the rotor 2 is provided a central path 12 extending in the rotational axis direction of the rotor 2. In FIG. 1, the central path 12 is formed as a path that passes through the central shaft 2a. In addition, inside the central shaft 2a of the rotor 2 is provided a rotor inner path 11 in a flat plane orthogonal to the rotational axis of the rotor 2. In FIG. 1, there are multiple rotor inner paths 11 disposed radially about the rotational axis of the rotor 2 in the plane orthogonal thereto.

On the flange 2b provided at one end of the central shaft 2a of the rotor 2, a recessed portion 13 coaxial with the central path 12 is provided on the central path 12 side surface thereof. Inside the flange 2b of the rotor 2 are provided flange inner paths 14 within a plane that passes straight through the rotational axis of the rotor 2, with the flange inner paths 14 extending radially from the rotational axis.

One end of the flange inner paths 14 is disposed at the recessed portion 13 and the other end at an outside surface of the flange 2b. At the ends of the paths disposed at the outside surface of the flange 2b of the rotor 2 are provided driving fluid nozzles 15. It is to be noted that, in the first embodiment, the flange 2c disposed at the other end of the central shaft 2a of the rotor 2 functions as a weight for balance adjustment as well as a supporting member in the thrust direction (the rotational axis direction of the rotor 2).

The driving fluid supplied from the driving fluid inlets 8 provided on the stator 3 travels from path stator inner path 7→rotor inner path 11→central path 12→flange inner path 14 and is then jetted outside the spindle device 1 from the driving fluid nozzles 15. A configuration of a communication part 16 from the stator inner path 7 to the rotor inner path 11 will be described later (refer to explication of FIG. 5-FIG. 7). It is to be noted that the central shaft 2a and the flanges 2b, 2c are constituent components of the rotor 2, and therefore the central path 12, the flange inner path 14, and the rotor inner path 11 constitute paths within the rotor 2.

A bearing fluid outlet 26 is an exhaust port for releasing bearing fluid flowing into bearing fluid exhaust paths 27 (see FIG. 6a) to be described later to the outside from the spindle device 1. The bearing fluid outlet 26 is provided on the flange 2c aligned with the positions of the bearing fluid exhaust paths 27 shown in FIG. 6a.

For the fluid supplied from the bearing fluid inlet 8 and the static-pressure fluid bearing fluid inlet 10 provided on the stator 3, for example, pressurized air, nitrogen gas, helium gas, argon gas, and carbonic acid gas may be used.

FIGS. 2a and 2b are diagrams showing the internal structure of the rotor 2 and a flow 17 of the driving fluid in the spindle device 1 according to the first embodiment of the present invention. FIG. 2a is a cross-sectional view of the internal structure of the rotor 2 and FIG. 2b is a cross-sectional view of the flange 2b along a surface orthogonal to the rotational axis of the rotor 2.

As shown in FIG. 2a, driving fluid supplied from the driving fluid inlet 8 (see FIG. 1) flows from the rotor inner path 11 formed in the central shaft 2a of the rotor 2→central path 12→flange inner path 14 to the outside of the spindle from the driving fluid nozzles 15. The driving fluid jetted from the driving fluid nozzles 15 is ejected in a circumferential direction of the rotational axis of the rotor 2. By jetting driving fluid in the circumferential direction of the flange 2b in this manner, the rotor 2 acquires torque from repulsive force generated by the driving fluid.

It is to be noted that, by enabling the direction in which the driving fluid nozzles 15 are mounted on the flange 2b to be changed, the direction of rotation of the rotor 2, either clockwise or counterclockwise, may be selected as convenient. In FIG. 2b, when the direction of the driving fluid nozzles 15 is set to the right, the rotor 2 rotates in a counterclockwise direction, and when the direction of the driving fluid nozzles 15 is set to the left, the rotor 2 rotates in a clockwise direction (as seen from above the paper in which the drawing appears).

Using FIGS. 3a and 3b, a description will be given once again of jetting directions 18 of the driving fluid and the direction of rotation 19 of the rotor 2. FIGS. 3a and 3b are diagrams showing the fluid jetting directions 18 and the direction of rotation 19 of the rotor 2 in the spindle device 1 according to the first embodiment of the present invention. FIG. 3a is a side view of the spindle device 1 and FIG. 3b is a cross-sectional view of the flange 2b at a location indicated by the broken cross-sectional line B-B in FIG. 3a. The boundary area between the flange 2b and the stator 3 shown in FIG. 3a is shown in greater detail in FIG. 5.

As shown in FIG. 3b, the driving fluid is jetted evenly around the rotational axis of the rotor from the plurality of driving fluid nozzles 15 disposed on the outside surface of the flange 2b (the jetting directions 18 are the directions indicated by the white arrows). By the repulsive effect from the driving fluid, the rotor rotates in the counterclockwise direction as seen from above the drawing (the direction of rotation 19 is the direction indicated by the black arrow).

Figure 4:
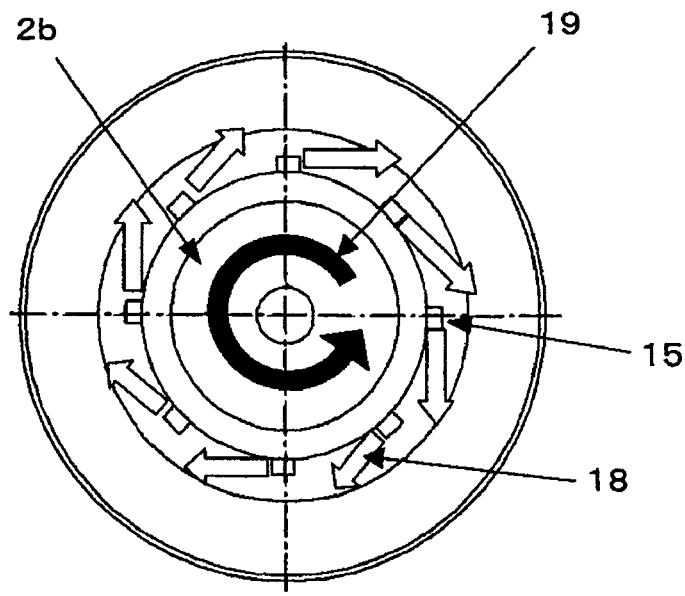
FIG. 4 is a diagram showing a structure in which change in flow of jetting fluid that is the driving fluid in dependence on angle of rotation does not occur, in the spindle device according to the first embodiment of the present invention.

FIG. 4 is a diagram showing a structure in which change in a flow of a jetting fluid that is the driving fluid depending on angle of rotation does not occur, in the spindle device 1 according to the first embodiment of the present invention. As described with reference to FIGS. 3a and 3b, the driving fluid is jetted in directions 18 indicated by the blank white arrows from the driving fluid nozzles 15. By the repulsive force from the driving fluid thus jetted, the rotor 2 rotates in the counterclockwise direction 19 as seen from above the drawing.

In the first embodiment of the present invention, as seen in FIG. 4, the driving fluid is jetted in a fully opened space. This is because if there are projections or holes near the jetting outlets of the driving fluid nozzles 15 they would impart a periodical effect to the rotor 2. Accordingly, to eliminate the impact of the fluid jetted from the driving fluid nozzles 15, the driving fluid is jetted into spaces or onto smooth surfaces positioned at locations sufficiently far apart.

As shown in FIG. 4, the jetting directions 18 of the driving fluid jetted from the driving fluid nozzles 15 are distributed uniformly about the rotational axis of the rotor 2 and the jetting of the driving fluid does not depend on the angle of rotation of the flange 2b (rotor 2), indicating that there are no elements present that impact the jetting of the driving fluid. In FIG. 4, by jetting the driving fluid in the jetting directions 18 (the white arrow directions) the rotor 2 is rotated in the direction of rotation 19 indicated by the black arrow.

As shown in FIG. 4, the jetted driving fluid no longer affects the spindle device 1 including the flange 2b and the propulsive force generated by the jetting of the driving fluid does not attenuate, thereby enabling the rotor 2 to rotate consistently with accuracy as well as high velocity. Therefore, the present invention can prevent the appearance on the workpiece of a pattern of rays caused by the impact of the driving fluid on the conventional air spindle.

Figure 5:
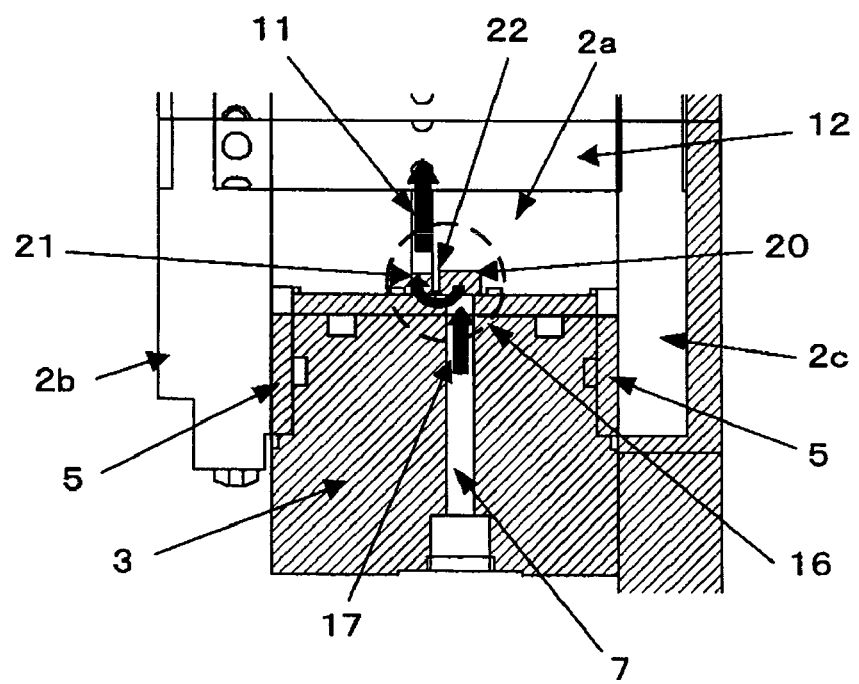
FIG. 5 is a diagram partially showing a structure of a path of the driving fluid provided in the stator and the rotor in the spindle device according to the first embodiment of the present invention.

FIG. 5 is a diagram showing a portion of the structure of the path of the driving fluid provided in the stator 3 and in the rotor 2 in the spindle device 1 according to the first embodiment of the present invention. A communication part 16 that connects the stator inner path 7 and the rotor inner path 11 (located inside the dashed-line circle in the drawing) has a first space 20 and a second space 21. The first space 20 and the second space 21 are formed as continuous recessed grooves all the way around the circumferential surface of the central shaft 2a of the rotor 2.

The driving fluid flows through the stator inner path 7 and first enters the first space 20. Then, the driving fluid next enters the second space 21 that communicates with the first space 20. The driving fluid that enters the second space 21 flows into the rotor inner path 11. A detailed description is given of the structure and function of the first space 20 and the second space 20 using FIGS. 6a-6d.

Figure 6A:
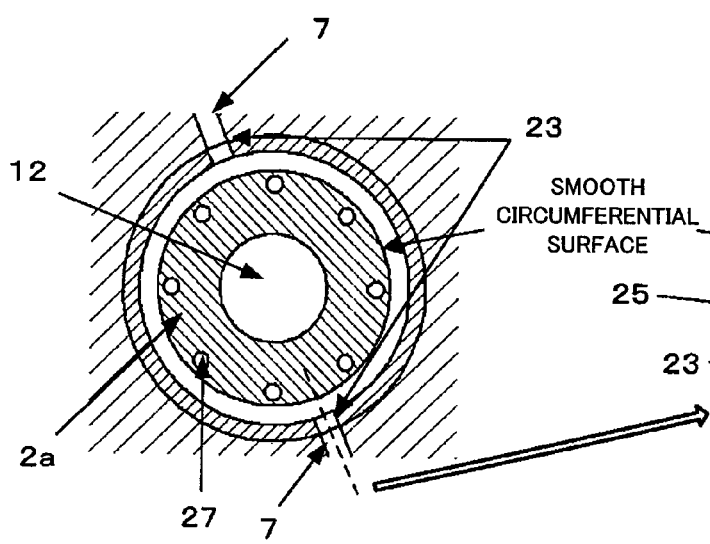
FIGS. 6a-6d are diagrams showing the relative positions of a driving fluid outlet from the stator and an inner path penetrating inside the rotor in the spindle device according to the first embodiment of the present invention.
Figure 6B:
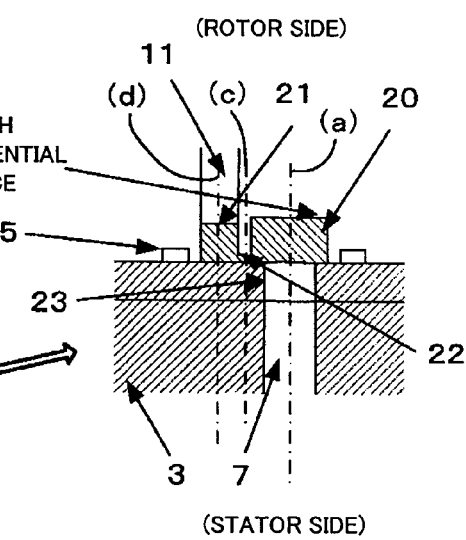
Figure 6C:
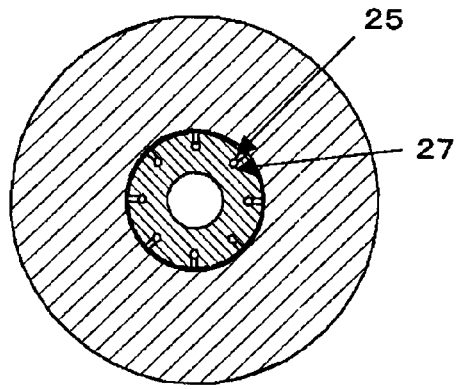
Figure 6D:
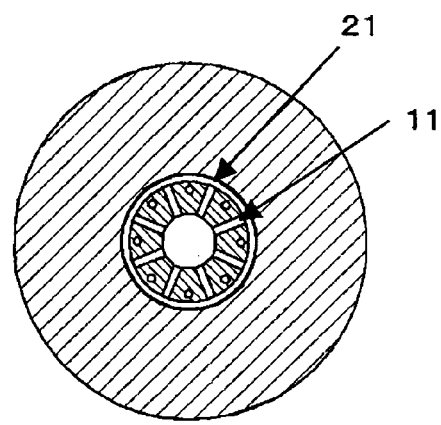

FIGS. 6a-6d are diagrams showing the relative positions of a driving fluid flow outlet 23 from the stator 3 and a rotor inner path 11 provided inside the rotor 2 in the spindle device 1 according to the first embodiment of the present invention. FIG. 6a is a cross-sectional view of the stator inner path 7 (first space 20) portion at the position of the dotted-and-dashed line (a) shown in the FIG. 6b. FIG. 6c is a cross-sectional view of an exhaust space 25 portion at the position of the dotted-and-dashed line (c) shown in the FIG. 6b. FIG. 6d is a cross-sectional view of the rotor inner path 11 (second space 21) portion at the position of the dotted-and-dashed line (d) shown in the FIG. 6b. It is to be noted that FIG. 6a, FIG. 6c, and FIG. 6d are cross-sectional views of surfaces perpendicular to the paper on which the drawing appears, along the dotted-and-dashed lines shown in FIG. 6b.

As described above with respect to FIG. 5, the first space 20 and the second space 21 are formed as continuous recessed grooves all the way around the circumferential surface of the central shaft 2a of the rotor 2. As shown in FIG. 6b, the first space 20 and the second space 21 are disposed parallel to each other in the rotational axis direction of the rotor 2. Then, since the first space 20 in the second space 21 communicate via a gap 22, as shown in the drawing the stator inner path 7 and the rotor inner path 11 do not communicate directly with each other.

By configuring the driving fluid paths as described above, the spindle device 1 that is the first embodiment of the present invention offsets the relative positions of the outlet of the stator inner path 7 provided in the stator 3 and the inlet of the rotor inner path 11 provided in the rotor 2 in the axial direction of the rotational axis of the rotor 2. Then, a bottom surface of the first space 20 (corresponding to the front surface of the rotor 2 that faces the outlet) is formed as a smooth surface without steps or holes with respect to the direction of rotation of the rotor 2.

Therefore, driving fluid entering the first space 20 flows through the narrow gap 22 formed between the radial bearing 4 and the front surface 2a of the central shaft of the rotor 2. With such a configuration, creation of pulsation when the driving fluid enters the rotor inner path 11 can be prevented. Since creation of pulsation can be prevented, the rotor 2 can achieve accurate rotation.

It is to be noted that the bearing fluid exhaust paths 27 provided in the central shaft 2a of the rotor 2 as shown in FIG. 6a are there to release bearing fluid entering the exhaust space 25 to be described later (described with reference to FIG. 7) to the outside of the spindle device 1 from the bearing fluid outlet 26 (see FIG. 1, FIGS. 2a and 2b). The bearing fluid exhaust paths 27 are spaced equidistantly around the outer peripheral surface of the central shaft 2a of the rotor 2. Although the number of the bearing fluid exhaust paths 27 thus arranged can be selected as convenient, in view of the inertial moment of the rotor, it is preferable to dispose an even number of bearing fluid exhaust paths 27 spaced equidistantly in the central shaft 2a of the rotor 2 around the rotational axis of the rotor 2.

Figure 7:
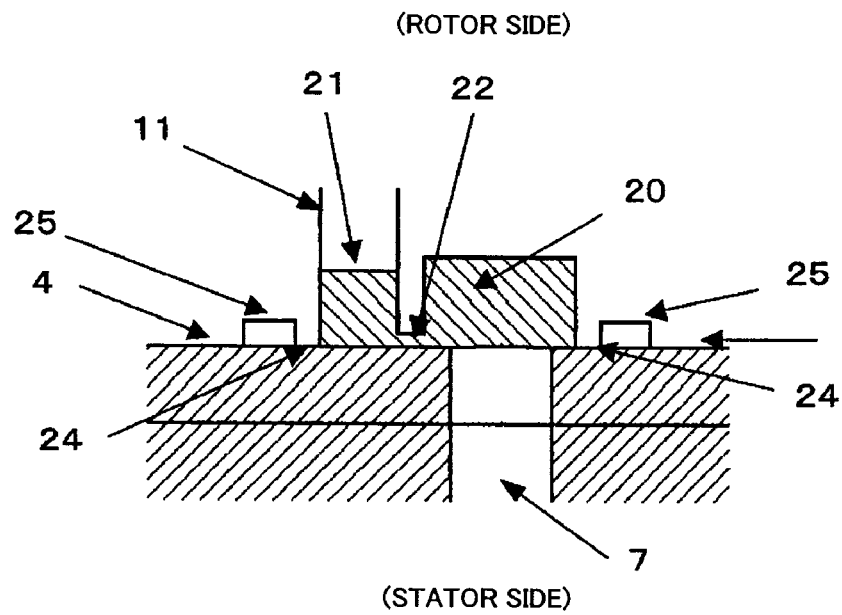
FIG. 7 is a diagram showing a structure that prevents bearing fluid supplied to a static-pressure fluid bearing from flowing to a rotary drive system of the rotor using seal faces and an exhaust space so that the static-pressure fluid bearing and the driving fluid drive system maintain independent fluid pressures, in the spindle device according to the first embodiment of the present invention.

FIG. 7 is a diagram showing a structure that prevents bearing fluid supplied to the static-pressure fluid bearing from flowing to a rotary drive system of the rotor using a seal face 24 and the exhaust space 25 so that the static-pressure fluid bearing and the driving fluid drive system can maintain independent fluid pressures, in the spindle device 1 according to the first embodiment of the present invention. In the drawing, the static-pressure fluid bearing is the radial bearing 4.

In the first embodiment, the exhaust space 25 is formed in the surface of the central shaft 2a of the rotor 2, near where the first space 20 and the second space 21 are formed. The exhaust space 25 is an exhaust means for releasing bearing fluid supplied to the static-pressure fluid bearing, and like the first space 20 and the second space 20 is formed as a continuous recessed groove all the way around the circumferential surface of the central shaft 2a of the rotor 2. Then, a seal face is formed between the exhaust space 25 and the first space 20 and the second space 21 that has a gap interval that is the same as the static-pressure fluid bearing gap. By providing the exhaust space 25 in the vicinity of the first space 20 and the second space 21, the bearing fluid supplied to the static-pressure fluid bearing can be prevented from flowing into the rotary drive system of the rotor 2.

By thus preventing the bearing fluid for the static-pressure fluid bearing from flowing into the drive system as described above, separate fluid pressures can be maintained for the static-pressure fluid bearing and the driving fluid rotary drive system. Driving fluid entering the first space 20 passes through the gap 22 and flows into the second space 21. The gap interval of the gap 22 is set greater than the gap interval of the seal face 24, and thus the driving fluid flows into the second space 21 without entering the exhaust space 25, and then flows into the rotor inner path 11. It should be noted that, ordinarily, the pressure of the bearing fluid supplied to the static-pressure fluid bearing is greater than the pressure of the driving fluid. Therefore, the bearing fluid can be prevented from affecting the drive system of the rotor 2 by collecting the bearing fluid exhaust from the static-pressure fluid bearing in the exhaust space 25.

By configuring the spindle as described above, the first embodiment of the present invention can eliminate the effects of the static-pressure fluid bearing on the rotor drive system, enabling the rotor 2 to be rotatively driven with accuracy.

Figure 8:
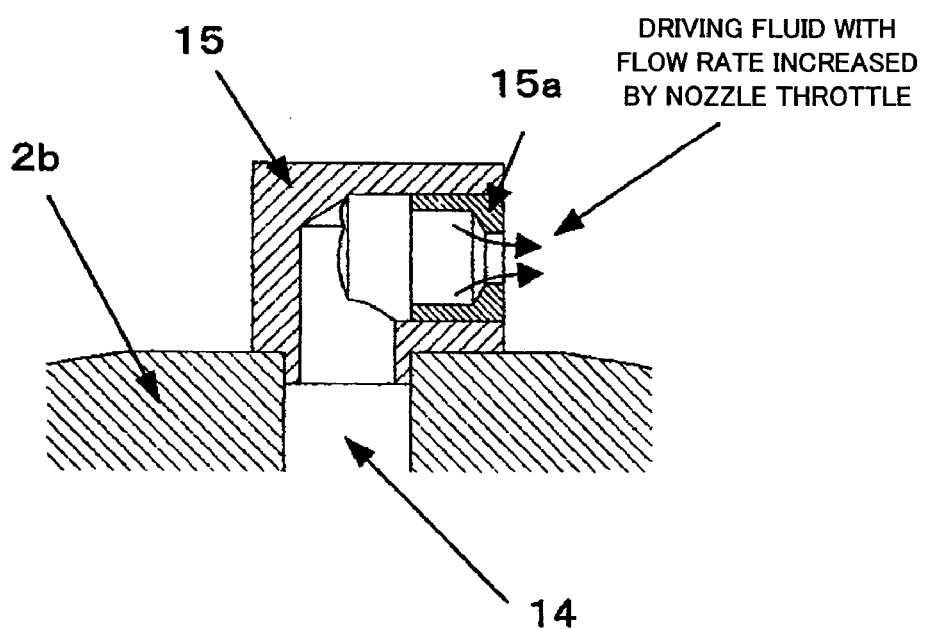
FIG. 8 is a diagram showing a structure that restricts a jetted diameter of the driving fluid with a nozzle throttle and increases a jetting flow rate of the driving fluid in the spindle device according to the first embodiment of the present invention.

FIG. 8 is a diagram showing a structure that restricts a jetted diameter of the driving fluid with a nozzle throttle and increases a jetting flow rate of the driving fluid in the spindle device 1 according to the first embodiment of the present invention. A throttle 15a is provided on the driving fluid nozzle 15 arranged on the peripheral side surface of the flange 2b. Driving fluid from the flange inner path 14 reaches the driving fluid nozzle 15, where a flow diameter is restricted by the throttle 15a mounted on the tip of the nozzle 15. As a result, it is possible to restrict the jetted diameter of the fluid when jetting the driving fluid, thus increasing the flow rate.

Figure 9A:
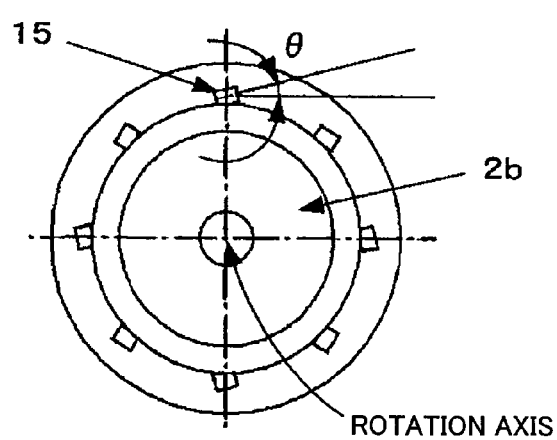
FIGS. 9a and 9b are diagrams illustrating preventing interference with exhaust during high-velocity rotation by angling the driving fluid nozzles in the spindle device according to the first embodiment of the present invention.
Figure 9B:
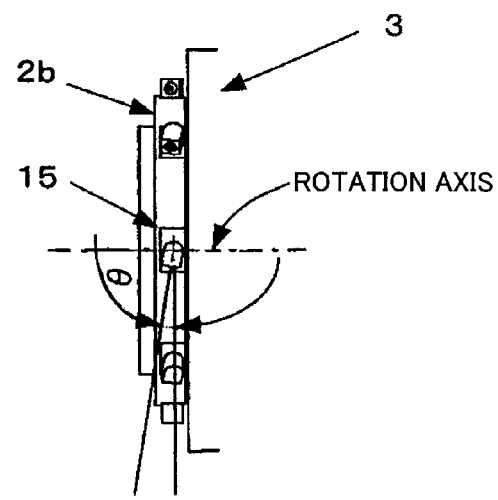

FIGS. 9a and 9b are diagrams illustrating preventing interference with exhaust during high-velocity rotation by angling the driving fluid nozzles in the spindle device 1 according to the first embodiment of the present invention. The driving fluid nozzles 15 used in the spindle device 1 of other embodiments of the present invention described later can be similarly angled.

As the flow rate of the driving fluid jetted from the driving fluid nozzles 15 increases, driving fluid jetted from adjacent driving fluid nozzles 15 begins to interfere with each other, affecting the accurate rotation of the rotor 2. In addition, it becomes difficult to increase the rotational velocity of the rotor 2. Accordingly, the jetting directions 18 of the driving fluid nozzles 15 are angled with respect to the direction of a tangent as shown in FIG. 9a (in FIG. 9a angled outward with respect to the tangent direction), angled with respect to a flat plane orthogonal to the axial direction as shown in FIG. 9b (in FIG. 9b angled away from the spindle device 1 body), or angled in a way that involves a combination of the two. By adjusting the jetting directions as described above, interference between driving fluids jetted from each of the driving fluid nozzles 15 can be prevented.

Figure 10A:
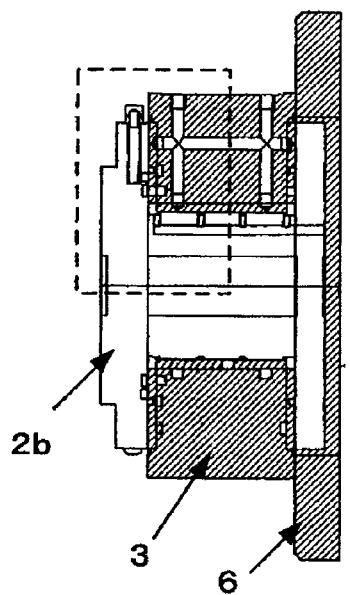
FIGS. 10a and 10b are diagrams showing a spindle device according to a second embodiment of the present invention in which supply of driving fluid to the rotor is carried out on a thrust bearing side.
Figure 10B:
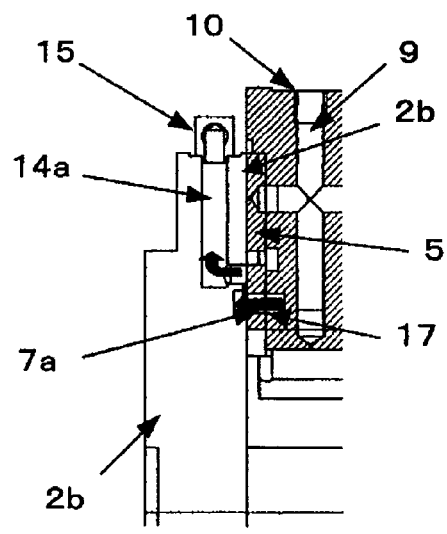

FIGS. 10a and 10b are diagrams showing a case in which supply of driving fluid to the rotor 2 is carried out on a thrust bearing 5 side in a spindle device 1 according to a second embodiment of the present invention. FIG. 10a is a cross-sectional view of the spindle device 1, in which a mechanism for supplying driving fluid to the flange 2b of the rotor 2 is provided on the thrust bearing 5 side. FIG. 10b is a diagram illustrating main portions of the mechanism to supply driving fluid to the flange 2b of the rotor 2 (the portion inside the dashed line in FIG. 10a).

In FIGS. 10a and 10b, driving fluid supplied from the driving fluid inlet, which is omitted from the drawings, flows through a stator inner path 7a provided inside the stator 3 and enters a flange inner path 14a provided in the flange 2b of the rotor 2. The driving fluid is then jetted outside the spindle device 1 including the flange 2b from the driving fluid jetting nozzles 15 provided on the peripheral side surface of the flange 2b.

The configuration of the spindle device 1 of the second embodiment does not require forming a space in the central shaft 2a of the rotor 2 that is the central path 12. As a result, the diameter of the rotor can be minimized. In addition, in the present embodiment, the stator inner path 7a and the flange inner path 14a do not communicate directly; rather, as described in the first embodiment, a mechanism corresponding to the first space 20, the second space 21, and the gap 22 is provided in the flange 2b of the rotor 2 to prevent generation of pulsation in the driving fluid as it flows into the flange inner path 14a provided in the flange 2b.

Figure 11A:
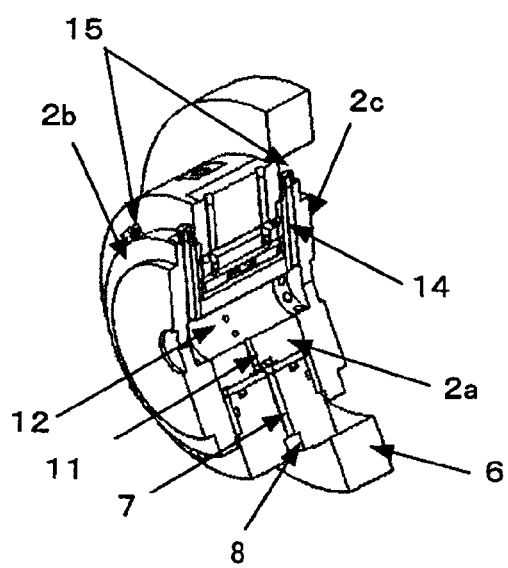
FIGS. 11a and 11b are diagrams showing a spindle device according to a third embodiment of the present invention in which the rotor has flanges provided with driving fluid nozzles at both ends of a rotation axis of the rotor.
Figure 11B:
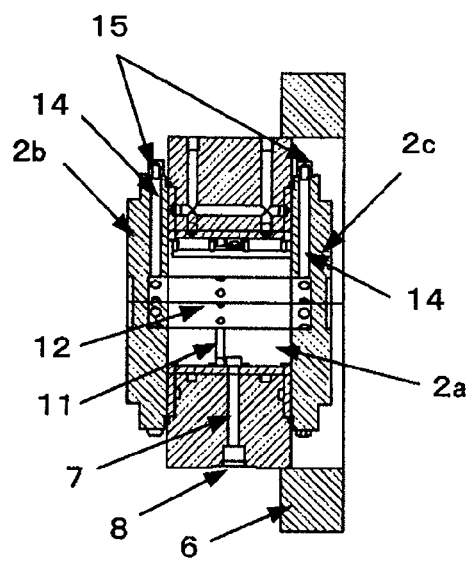

FIGS. 11a and 11b are diagrams showing a spindle device 1 according to a third embodiment of the present invention, in which flanges 2b, 2c provided with driving fluid nozzles 15 form the two ends of a central shaft 2a of the rotor 2 and are provided outside the stator 3. In the first embodiment of the present invention, driving fluid paths were formed only in the flange 2b, and the flange 2c was made to function as a weight for balance adjustment. In the third embodiment of the present invention shown in FIGS. 11a and 11b, driving fluid nozzles 15 are also disposed on the flange 2c as well. With such a configuration, drive torque can be obtained at both ends of the rotor 2. As a result, it is possible to provide a spindle capable of even higher rotation velocity.

As described above, the spindle of the present invention, because it has a structure that does not have blades, can eliminate the vibration caused by the blades and the nozzles that was generated in the air spindles described in the background art. Because it is able to eliminate vibrations, the spindle of the present invention can rotate smoothly.

Accordingly, because it can eliminate vibration of the spindle and the effects of vibration on machinery, the present invention can improve shape accuracy and surface roughness of the workpiece. Moreover, because blades are not necessary, the blade machining steps can be eliminated. Further, because the present invention uses a radial bearing and a thrust bearing for the static-pressure fluid bearings, the rotor and the starter become contactless, thus reducing the transmission of vibration to the stator.

Figure 12A:
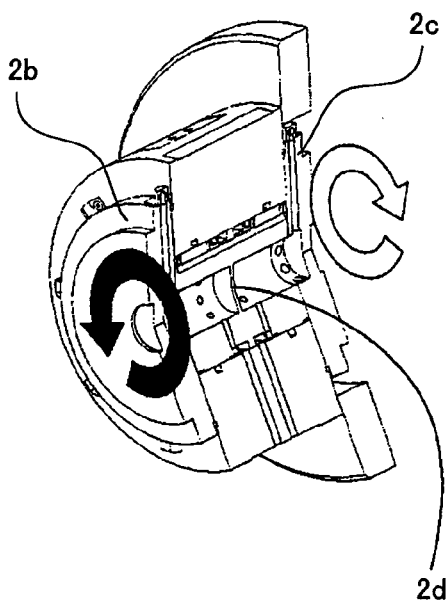
FIGS. 12a and 12b are diagrams showing a spindle device according to a fourth embodiment of the present invention in which jetting directions of nozzles provided on a base side flange is opposite to jetting directions of nozzles provided on a proximal side flange such that the rotor is rotated in both clockwise and counterclockwise directions by switching the path of the driving fluid.
Figure 12B:
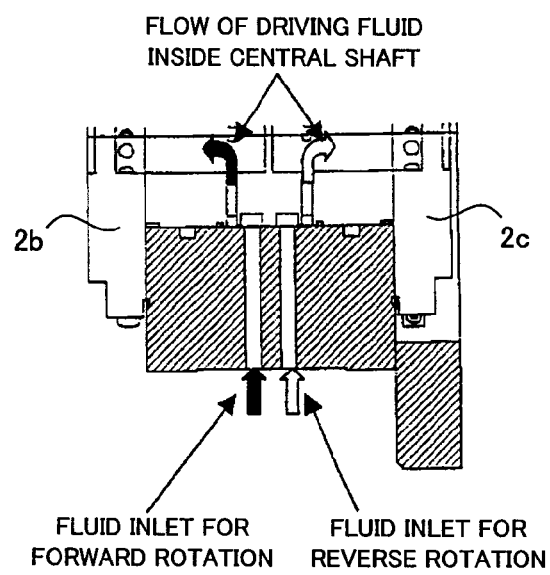

FIGS. 12a and 12b are diagrams showing a spindle device 1 according to a fourth embodiment of the present invention in which a jetting direction of a nozzle mounted on a base side flange 2c is the opposite of a direction of a nozzle mounted on a proximal side flange 2b, such that the rotor 2 can be rotated in both clockwise and counterclockwise directions by switching the path of the driving fluid.

As shown in FIGS. 12a and 12b, clockwise direction (reverse rotation) and counterclockwise direction (forward rotation) driving fluid supply paths are provided in the rotor 2 and the stator 3, and a partition 2d is provided in the center of the central shaft 2a of the rotor 2 to divide the aforementioned supply paths into separate paths. It is to be noted that placement of the partition 2d is not limited to the center of the central shaft 2a, and where the partition 2d is placed can be changed as convenient to create to separate paths, the clockwise direction path and the counterclockwise direction path.

With such a configuration, driving fluid from the nozzles provided on both flanges 2b, 2c can be selectively jetted, such that, from the driving fluid nozzles 15 provided on the flanges 2b, 2c, driving fluid can be independently jetted for the clockwise direction (reverse rotation) and the counterclockwise direction (forward rotation), respectively.

Ordinarily, a fluid-rotation spindle does not have braking means. However, according to the present embodiment, by switching the drive direction from forward rotation to reverse rotation (or from reverse rotation to forward rotation), the rotation of the rotor can be reduced or stopped contactlessly. In addition, depending on the type of workpiece or tool, the machine space can sometimes be limited and the orientations during machine can sometimes be limited. In such cases, the machining space can be used effectively because rotation in both the clockwise direction and the counterclockwise direction is possible.

What is claimed is:

1. A spindle device driven by driving fluid, comprising:
   a stator having at least one inlet for introducing the driving fluid;
   a rotor having at least one flange arranged outside of said stator and provided with nozzles for jetting the driving fluid; and
   a static-pressure fluid bearing for rotatably supporting said rotor with respect to said stator;
   wherein said stator has a first inner path for conducting the driving fluid introduced from the inlet to said rotor, said rotor has a second inner path communicating with the first inner path of said stator for conducting the driving fluid to the nozzles, thereby the driving fluid introduced from the inlet of said stator is jetted from the nozzles of said rotor through the first and second inner paths to rotate said rotor.

2. A spindle device according to claim 1, wherein the nozzles have throttle members.

3. A spindle device according to claim 1, wherein an outlet of the first inner path of said stator and an inlet of the second inner path of said rotor are arranged to be displaced with each other in a direction of a rotational axis of said rotor, and a surface of said rotor facing the outlet of the first inner path is formed smooth in a direction of the rotational axis of said rotor.

4. A spindle device according to claim 1, wherein an exhaust space for discharging fluid of said fluid bearing is provided in a vicinity of a junction of the first inner path of said stator and the second inner path of said rotor, and seal surfaces having the same gap as said fluid bearing are provided between the exhaust space and the junction.

5. A spindle device according to claim 1, wherein the driving fluid jetted from the nozzles is directed to form an angle with respect to a plane perpendicular to a rotational axis of said rotor or to form an angle with respect to a tangential direction of the flange of said rotor.

6. A spindle device according to claim 1, wherein said rotor has two flanges each provided with the nozzles for jetting the driving fluid.

7. A spindle device according to claim 6, wherein the nozzles provided on one of the two flanges are arranged to jet the driving fluid to rotate said rotor clockwise, the nozzles provided on the other of the two flanges are arranged to jet the driving fluid to rotate said rotor counterclockwise, and the spindle device further comprises means that selectively supplies the driving fluid to the nozzles of the two flanges.

* * * * *